UNITED STATES PATENT OFFICE.

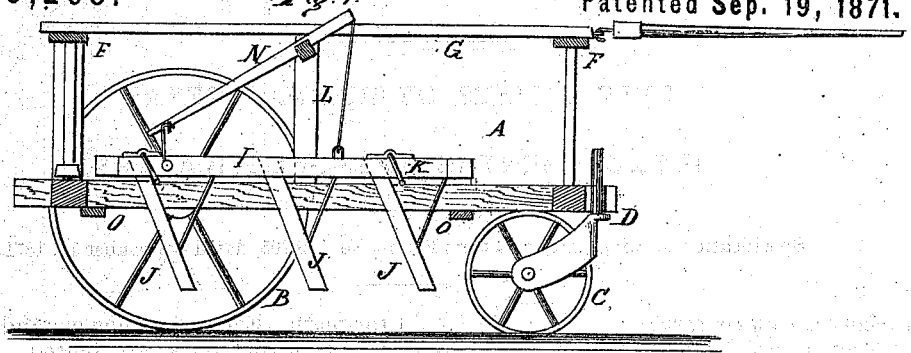
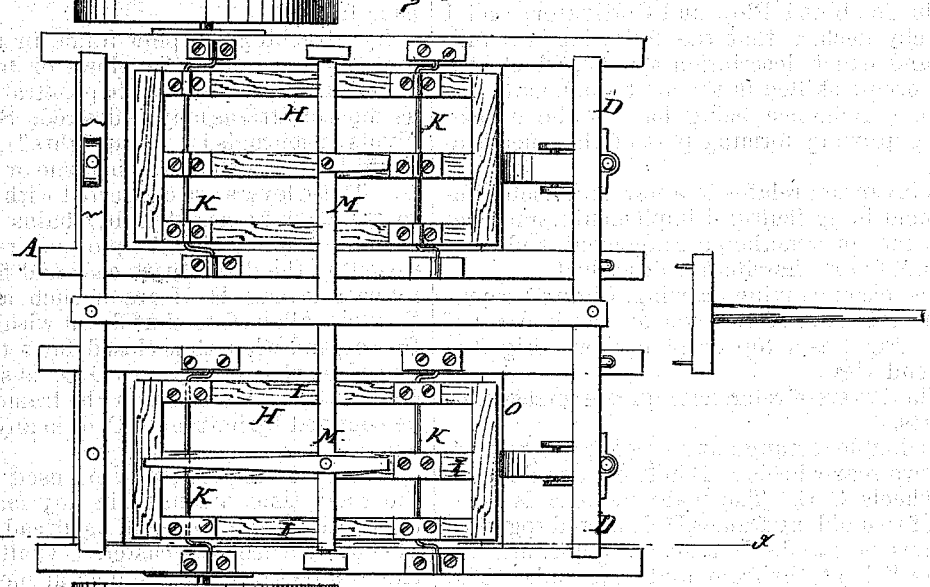
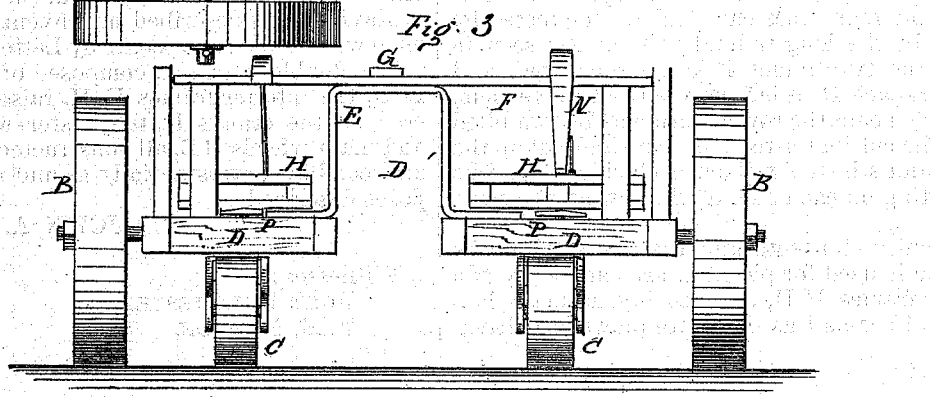

JOHN A. VIARS, OF SHERMAN, TEXAS.

IMPROVEMENT IN WHEEL-CULTIVATORS.

Specification forming part of Letters Patent No. 119,205, dated September 19, 1871.

*To all whom it may concern:*

Be it known that I, JOHN A. VIARS, of Sherman, in the county of Grayson and State of Texas, have invented a new and useful Improvement in Combined Plow and Cultivator; and I do hereby declare that the following is a full, clear, and exact description thereof, which will enable others skilled in the art to make and use the same, reference being had to the accompanying drawing forming part of this specification.

This invention relates to a new and useful improvement in agricultural implements; and consists in the construction, arrangement, and combination of parts hereinafter described.

In the accompanying drawing, Figure 1 represents a vertical section taken on the line $x\ x$ of Fig. 2. Fig. 2 is a top or plan view. Fig. 3 is a rear end view.

Similar letters of reference indicate corresponding parts.

A is a double rectangular-shaped frame, mounted on two rear wheels B B and on two forward pivot-wheels C C. The main frame A is composed of two oblong frames D D, united together by means of standards and cross-rails, and by the bars E E at the front and rear ends. The front and rear cross-bars F F are connected together by the longitudinal rail G. As seen in Fig. 3, the two frames D D are separated, and an open space, D', is left between and above them, by which means the row of corn may be straddled while the cultivator-teeth operate and cut up the weeds and stir the soil on each side of it, thus cultivating on each side of the row at the same time.

The cultivator-teeth and the plows, when the machine is used for plowing, are carried by two interior frames, H H, each having as many longitudinal beams I as there are plows or cultivator-teeth. Each beam has a standard, J, to which the plows or teeth are bolted. These interior frames H H are connected with the main outer frames D D by cranks K, which extend across each frame.

By attaching the plow-frame in this manner it will be seen that the plows or teeth may be raised or lowered, or made to penetrate the ground as much or little as may be desired. Supported on pivots or journals by the uprights L L, is a cross-shaft, M, to which is attached one or more levers, N. These levers are connected with or attached to the plow-frames H H by chains or ropes, so that the frames, with the plows or teeth, may be raised by the driver with ease and facility. The interior frames H H are of such a width that they are allowed to shut down within the outer frames, and when thus closed down they are supported on the cross-pieces O O, as seen in Figs. 1 and 2. In this position the frames H H may be confined by buttons P P, or in any other manner.

One or more plows may be used at one and the same time, arranged in any manner, so as to be raised and lowered, as already described. The pivot-wheels or casters C C allow the machine to be turned in the field at pleasure.

Having thus described my invention, I claim as new, and desire to secure by Letters Patent—

The double frame A, composed of the frames D D, the interior frames H H, raised and lowered on the cranks K, the caster-wheels C C, and main wheels B B, all constructed, arranged, and combined substantially as and for the purposes described.

JOHN A. VIARS.

Witnesses:
 JOHN DORCHESTER,
 J. M. NEWTON.